April 21, 1964   J. M. BRITTON ETAL   3,129,890
EMERGENCY RUNWAY FOAMER
Filed Oct. 23, 1962   4 Sheets-Sheet 1
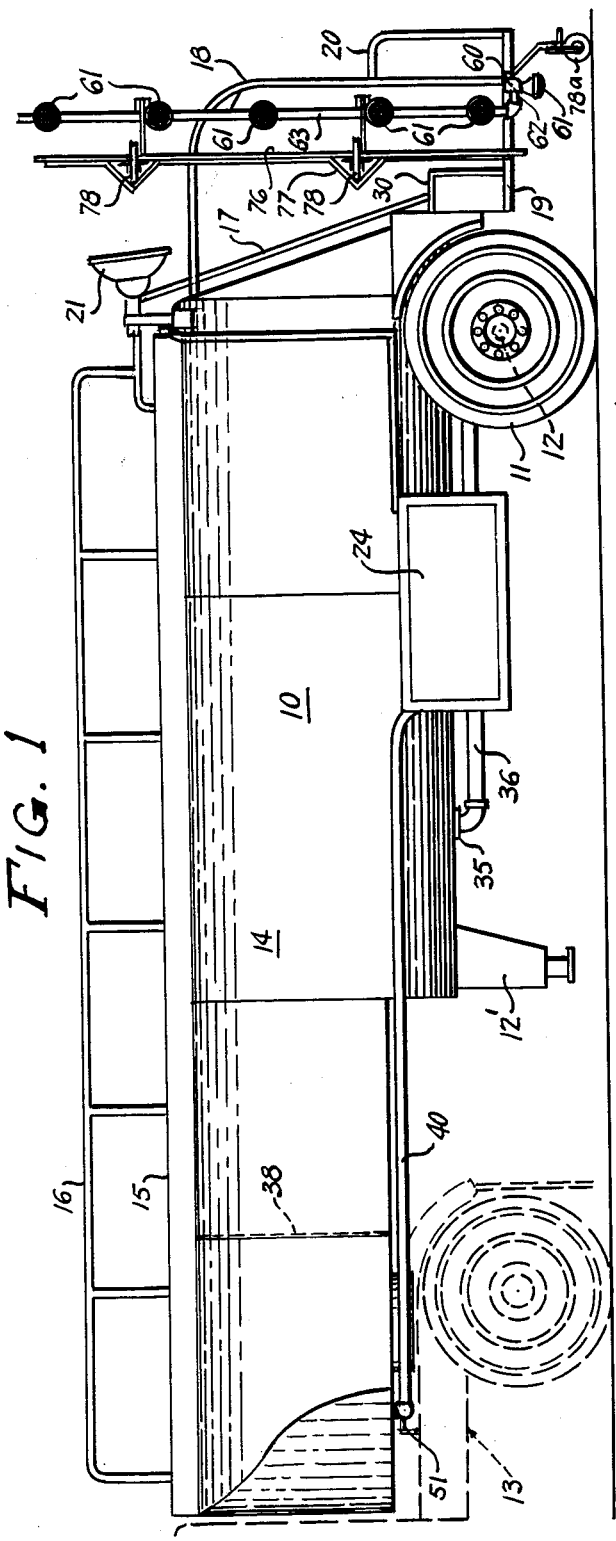
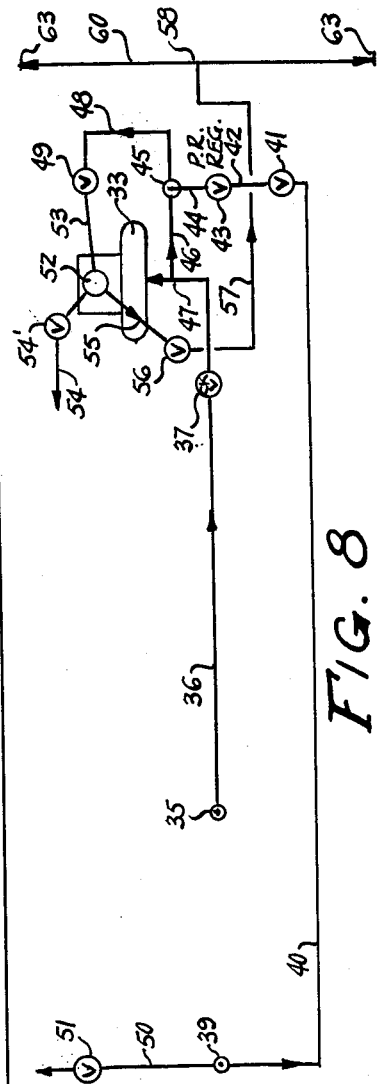
INVENTORS
JEAN M. BRITTON
REED F. CALHOUN
BY
Kimmel & Crowell
ATTORNEYS

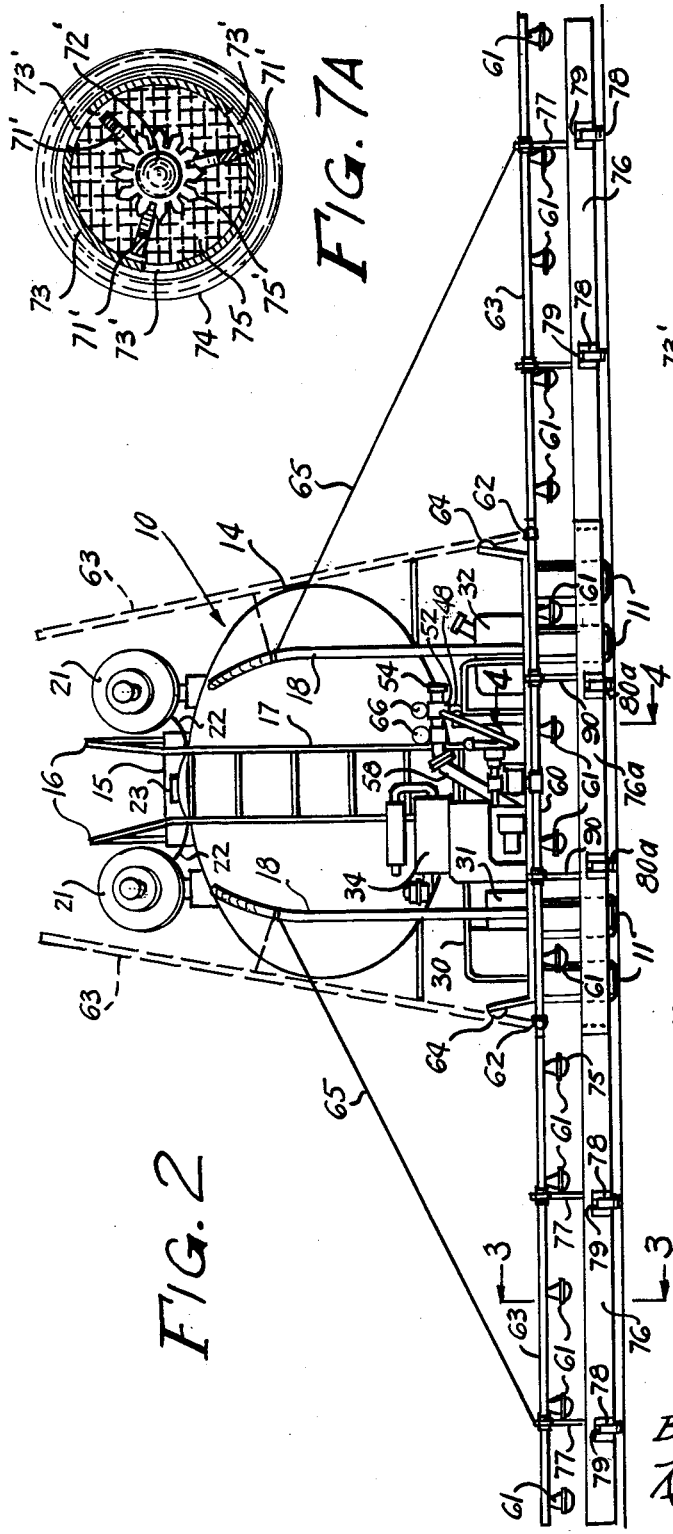

April 21, 1964  J. M. BRITTON ETAL  3,129,890
EMERGENCY RUNWAY FOAMER
Filed Oct. 23, 1962  4 Sheets-Sheet 3

INVENTORS.
JEAN M. BRITTON
REED F. CALHOUN
BY Kimmel & Crowell
ATTORNEYS.

April 21, 1964　　　J. M. BRITTON ETAL　　　3,129,890
EMERGENCY RUNWAY FOAMER

Filed Oct. 23, 1962　　　　　　　　　　　　4 Sheets-Sheet 4

INVENTORS.
JEAN M. BRITTON
REED F. CALHOUN
BY
Kimmel & Crowell
ATTORNEYS.

United States Patent Office 3,129,890
Patented Apr. 21, 1964

3,129,890
EMERGENCY RUNWAY FOAMER
Jean M. Britton, 102 Lexington N.A.S., and Reed F. Calhoun, 714 Craig St., both of Corpus Christi, Tex.
Filed Oct. 23, 1962, Ser. No. 232,352
10 Claims. (Cl. 239—127)

This invention relates to a runway foaming apparatus and has particular applicability to a vehicle for effecting rapid and complete foam coverage of an air field runway in case of an emergency.

A primary object of the invention is the provision of an improved apparatus which will lay a blanket of foam of substantial width the full length of an aircraft runway in a rapid and expeditious manner.

An additional object of the invention is the provision of a device of this character employing a large capacity trailer or truck, and having extensible foamer pipes at the rear end thereof, whereby a relatively wide blanket of foam may be laid in a minimum of time as the truck moves the length of the runway.

A further important object of the invention is the provision of means, in association with the foam laying pipes whereby the thickness of the blanket of foam is controlled, and evened as the vehicle progresses.

Still another object of the invention is the provision of an apparatus of this character wherein the foam materials and water are proportionately mixed during transit of the vehicle, and then pressure ejected through the nozzle system.

As conducive to a clearer understanding of this invention, it may here be pointed out that at the present time foaming of runways is usually effected by conventional crash trucks at the scene of a potential emergency landing.

A considerable basic length of time is required to lay the foam, and a further length of time is consumed in replenishing the trucks with foam concentrated water. Still a further period of time is necessary for the crash trucks to return to a stand-by position nearer the runway. A total time is the time for a complete operation. Knowing the approximate time required to complete a foam strip is double value, in that when the aircraft fuel state is low the time requirement is highly important. Established procedure is to refrain from laying a foam protective blanket on a runway if time limitations or physical conditions would prevent all available vehicles from being fully operational at the time of the actual touchdown. Using the conventional crash and rescue trucks, foam is applied from the trucks while driving. The method is slow, empties the crash truck, requires time for reloading. A number of loads required varies from seven to eighteen or more, depending on the type of aircraft in trouble, the width and length of the runway, and other factors, and the total time required for the operation may run from two to three hours. When using in-service crash trucks and rescue crews, the foaming must be performed with a number of trucks discharging from the turrets. Under these conditions the crash rescue trucks and crews are away from the standby positions, and the method is slow, empties the crash trucks, and requires additional reloading and repositioning.

The cost of the foam material, the manpower and the equipment requirements are great, and result in a relatively high cost. By virtue of the instant invention, a runway of the same length and width may be operated by two men, an operator and a driver, in contrast to the 15 to 20 men employed in foaming a runway with crash trucks, such usage providing a uniform blanket with no gaps 30 feet wide and two inches thick, and three thousand feet long in approximately 16 minutes. Such blanket will exhaust approximately one-half of the capacity of the vehicle of the present invention, so that crash trucks can be resupplied at the scene. The apparatus of the instant invention is also adapted for attachment to hand lines, so that fire can be combatted by the vehicle in the event of a crash landing.

Additionally, employing the apparatus of the instant invention the crash rescue vehicles and crews are fully manned, loaded, and in stand-by position in the required emergency status.

An additional object of the invention is the provision of an apparatus of this character by means of which, after the emergency, the apparatus may be used quickly to remove the foam from the runways by merely closing the foam supply valve and using water instead of the fog nozzles to wash away the foam blanket.

Still other objects reside in the provision of emergency lighting equipment and electrical equipment which may be used in supplement to the usual crash trucks and crews, to illuminate the runway, or a crashed aircraft, or powering other auxiliary equipment, or for other use or essential purposes under emergency conditions.

Still other objects reside in the combinations of elements, arrangements of parts, and figures of construction, all as will be pointed out more fully hereinafter, and disclosed in the accompanying drawings, wherein there is shown one form of apparatus embodying the instant inventive concept.

In the drawings:

FIGURE 1 is a side elevational view of one form of foaming apparatus constructed in accordance with the instant invention and employed with a tank type trailer adapted to be secured to a tractor vehicle, the foaming apparatus being disclosed in retracted or transport position.

FIGURE 2 is a rear elevational view of the construction of FIGURE 1 showing the foaming apparatus in the extended position, the retracted or transport position being indicated in dotted lines.

FIGURE 6 is a fragmentary view showing a section of the pipe in elevation of an individual nozzle on an enlarged scale.

FIGURE 7 is a sectional view taken substantially along the line 7—7 of FIGURE 6 as given in the direction indicated by the arrows.

FIGURE 7A is a sectional view taken substantially along the line 7A—7A of FIGURE 6 as viewed in the direction indicated by the arrows.

FIGURE 8 is a schematic piping diagram showing the mixing apparatus employed in association with the vehicle of FIGURE 1.

Similar reference characters refer to similar parts throughout the several views of the drawing.

Figure 4:
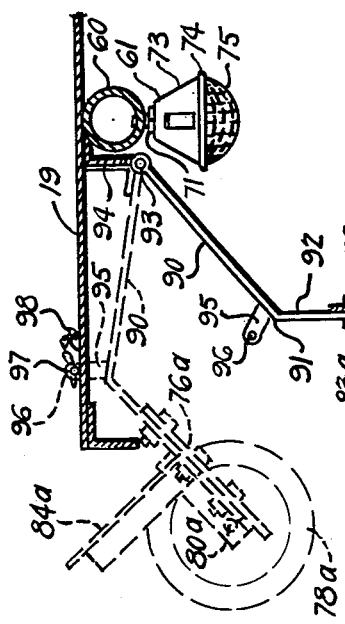
FIGURE 4 is an enlarged sectional view taken substantially along the line 4—4 of FIGURE 2 as in the direction indicated by the arrows.
Figure 7B:
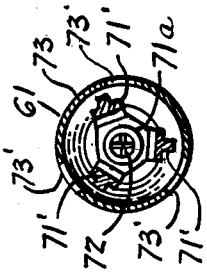
FIGURE 7B is a sectional view taken substantially along the line 7B—7B of FIGURE 6 as viewed in the direction indicated by the arrows.

Having reference now to the drawings in detail, there is generally indicated at 10 a tank trailer, in the illustrated embodiment of the invention herein shown, of approximately 4,000 gallons capacity, which is provided with the usual rear wheels 11 mounted on axles 12, stationary supports 12′, and suitable means, not shown, of conventional design for supporting the trailer on a tractor vehicle indicated on dotted lines at 13. The trailer comprises a compartment tank 14, which carries the usual top catwalk 15 and handrail 16, suitable filling openings (not shown) being provided on the top of the tank trailer for the several compartments thereof. At its rear end the trailer is provided with a ladder 17, handrails 18, a rearwardly extending platform 19, and safety handrails 20.

Outdoor type swivel floodlights 21 may be mounted on the rear of the tank, and supplied with power through lines 22 extending from an outlet box 23.

One side of the trailer is provided with a housing 24, which may contain a conventional generator set with outlets for power tools, while located on a similar position in the opposite side of the vehicle is a hose box of a similar size.

Positioned at a lower end of ladder 17 is a walkway 30, beneath which is positioned a battery and a gasoline tank 31 and 32, respectively supplying fuel and ignition for a conventional centrifugal pump 33, which may be of any desired capacity. In the illustrative embodiment shown a 500 g.p.m. type is employed. The pump is driven by the usual engine 34 and controlled in the usual manner.

Water is supplied to the pump 33 from an outlet 35 from the main body of the tank, which contains approximately 3,500 gallons of water, to a line 36 which contains a conventional check valve 37. The water compartment of the tank is divided from the foam compartment by means of a partition, indicated at 38 in dotted lines in FIGURE 1, which provides a foam tank of approximately 500 gallons capacity, and from which an outlet 39 leads through a gravity flow foam line 40, which is preferably comprised of 1½ inch internal diameter high pressure chemical hose, to a valve 41, which controls the flow of foam. A line 42 extends to a foam pressure regulating valve 43, from which a line 44 leads to a T 45, one leg of which is connected by a suitable hose or pipe 46 to a junction 47 with water supply line 36, whence the regulated foam is mixed with the water and passed to the pump 33. The other leg of T 45 extends through a line 48 comprising a by-pass line, which is controlled by a valve 49, as shown in FIGURE 8.

From the foam outlet 39 line 50 extends to a valve 51, and comprises a drain valve for the foam tank.

As best shown in FIGURES 8 and 2, pump 33 is provided with a main discharge outlet 52, which is connected through a line 53 to valve 49 of by-pass line 48, and which is also connected to an auxiliary discharge line 54, having a valve 54′ therein. The main outlet hose 55 extends through a primary control valve 56 to a line 57 which is connected as at 58 to a main distribution line 60. Main distribution line 60 is preferably comprised of 2 inch pipe fixedly secured beneath platform 19, and is provided at suitably spaced intervals, approximately 2 feet apart with discharge nozzles 61.

As best shown in FIGURES 6, 7, 7a and 7b, each nozzle 61 includes an inlet pipe 70, within which are positioned crossed wires 72. Lock nuts 71 secure a depending frusto-conical shield 73 to pipe 70, below which shield 73 flares outwardly to a rim 74, which has secured thereto an outwardly convexed wire mesh screen 75 which serves to admix and distribute the foam discharged from the individual nozzle. A threaded element or lock nut 71a secures to pipe 70 an internal diffuser or separator including radial downwardly inclined curved blades 71′ positioned interiorly of shield 73. The diffuser has at its base a spreader 75′ which has an upwardly projecting central cone 72′ in its center. Side openings 73′ are formed in shield 73 to provide aspiration, as is considered readily apparent to those skilled in the art, and additional diffusion of the foam.

At each end of main discharge pipe 60 there is provided a conventional swivel reducer 62, which communicates with auxiliary discharge pipes 63, which are also provided at spaced intervals of approximately 2 feet with additional discharge nozzles 61. When not in use, auxiliary discharge pipes 63 are moved to the position shown in full lines in FIGURE 1, substantially vertically, and rest against supporting brackets 64, being held thereagainst by any desired conventional means. When it is desired to lay a blanket of foam over a runway, the pipes are dropped to the full line position indicated in FIGURE 2, and suspended therein by a support chain 65, so that the auxiliary discharge pipes are in substantial horizontal alignment with main discharge pipe 60.

Figure 10:
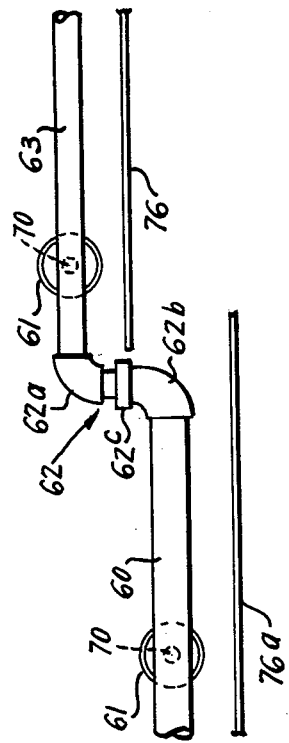
FIGURE 10 is an enlarged fragmentary view partially broken away showing a constructional detail.

Swivel reducer 62, as best shown in FIGURE 10, includes a pair of right angled elbows 62a and 62b connected to sections 63 and 60, respectively, and connected in rotatable alignment by a sealed swivel ring 62c.

The usual pressure gauges 66 are provided in conjunction with the pump outlet 52, as indicated in FIGURE 2.

Figure 9:
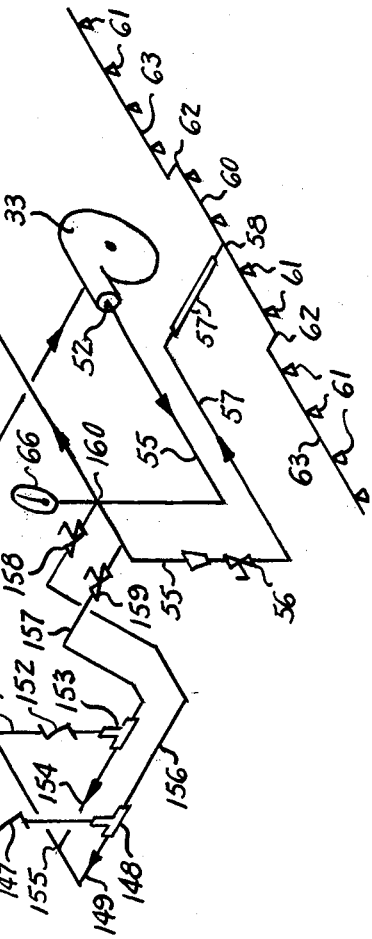
FIGURE 9 is a schematic piping diagram similar to FIGURE 8, but showing a modified arrangement of pipe connections.

FIGURE 9 discloses an amplified form of piping diagram wherein a valve 35′ is provided in line 36, which also contains a vibration connection comprised of a flexible bore 36′. An additional valve 39′ is also located in line 40. In this form of the invention, line 40 extends to a T connection 140 from which a line 141 extends through a valve 142 to a first regulator valve 143 having an external operating handle 143a, and a second line 143′ extends through a manual valve 144 to a second regulator valve 145 having an operating handle 145a. Beyond valve 143 a line 146 extends through a check valve 147 to a T-fitting 148 in a line 149 which extends to a junction 150 with water line 36, and from which line 36″ extends to pump 33.

A line 151 similar to line 146 extends from valve 145 through a check valve 152 to a T-fitting 153 from which a line 154 extends to a junction 155 with line 149. From opposite sides of T-fittings 148 and 153 by-pass lines 156 and 157 extend corresponding to by-pass line 48, respectively through ball valves 158 and 159 to auxiliary discharge line 54.

Main discharge line 55 extends from pump 33 to a junction 160 with line 54 and thence through valve 56 and line 57 to distribution line or pipe 60 as in the previous form.

A vibrator coupling 57′ is provided in line 57. Pressure gauge 66 is connected to line 55, as indicated. The operation is substantially the same as described in connection with FIGURE 8.

Figure 3:
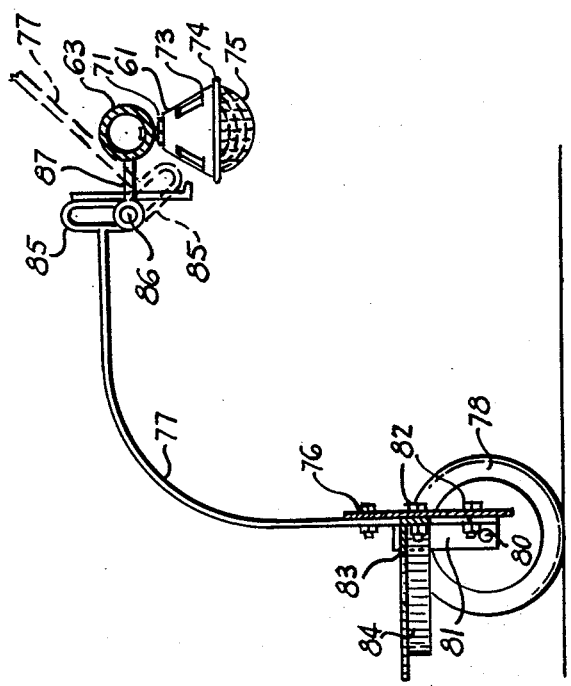
FIGURE 3 is an enlarged sectional view taken substantially along the line 3—3 of FIGURE 2 as viewed in the direction indicated by the arrows.
Figure 5:
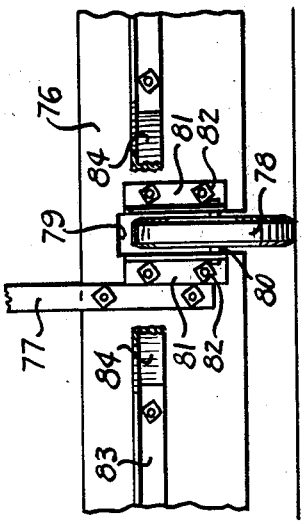
FIGURE 5 is a fragmentary rear elevational view of a portion of the structure of FIGURE 3.

Both the main and auxiliary discharge pipes are provided with foam spreaders. As best shown in FIGURES 3 and 4, the spreader for each auxiliary discharge pipe 63 comprises an aluminum plate 76 which is carried by a pair of arcuate arms 77 (see FIG. 2), and supported by a pair of wheels 78 which are mounted in vertical slots 79, on axles 80, which are in turn mounted between aluminum angles 81 secured by bolts 82, also preferably of aluminum on opposite sides of slots 79. The rear sides of spreader plate 76 are reinforced by aluminum angles 83 bolted thereto, the angles being outwardly bowed as at 84 adjacent the wheels 78.

The inner ends of arms 77 are provided with loops 85 which surround pin 86 secured by brackets 87 to pipe 63, and are so arranged that when the pipes 63 are folded to vertical position, the arcuate members 77 and their associated spreader plate 76 and attached components may be moved inwardly to the position indicated in dotted lines in FIGURE 3.

Main distributor pipe 60 is provided with a spreader plate 76a substantially identical to the plate 76 and similarly slotted and carried by identical wheels 78a mounted on axles 80a, the spreader plate 76a being similarly reinforced by an aluminum angle strip 83a bowed outwardly as at 84a behind the wheels. However, instead of the arcuate strips 77 spreader plate 76a is supported by a pair of aluminum strips 90, which are angled as at 91, with their vertical portions 92 bolted to the rear of plate 76a. The angular portions 90 are pivotally mounted on hinges 93 carried by depending brackets 94 on the underside of platform 19, and when in operative position the spreader 76a is supported immediately rearwardly of the nozzle 61, as best shown in FIGURE 4. A lug 95 is provided with an opening 96, and when it is desired to transport the apparatus when the spreader is not to be employed, the lugs 96 extend through a suitable opening in platform 19 and are secured in a dotted line position of FIGURE 4 by means of pins 97 secured to chains 98 and in turn secured to the platform 19.

The extended auxiliary distribution pipe 63 together with main pipe 60 of a width of approximately 30 feet, and, with their associated spreader plates 76a and 76, can thus provide a foam blanket of uniform thickness and of approximately 30 feet in width for the entire length of a runway, or until the entire capacity of the foam and water tanks is exhausted.

In the use and operation of the device the tanks are initially filled with foam and water, as previously indicated, and, in an emergency, the device is moved, with the auxiliary distributor pipes 63 in the vertical position of FIGURE 1 to an end of a runway upon which it is desired to apply a foam blanket. At this position the auxiliary pipes are lowered about their swivel 62, and the spreader members 76 positioned operatively or in their down position supported on rubber tired wheels 78. Simultaneously, spreader 76a is lowered by releasing the pins 97. Pump 33 is energized through motor 34, and foam is admitted to the pump through line 40 while water passes thereinto through line 36. The quantity of foam is regulated by valve 43, and, by opening valve 56 mixed foam and water is admitted to pipes 60 and 63 and thence discharged through nozzle 61. The vehicle moves slowly forward, at a desired speed, which may be approximately 6 to 7 miles per hour, and the foam is evenly distributed and spread by means of the spreader plates 76 and 76a.

When a requisite length of runway has been foamed, any remaining foam and water may be supplied to crash trucks at the scene, and the apparatus returned for refilling, or retained until the remainder of its contents becomes necessary, or the necessity therefor is passed. After the foam has served its purpose, the vehicle may be refilled, and, by means of the valve 41 the foam may be cut out of the system, the pump started, and water admitted through distribution pipes 60 and 63 and nozzle 61 to clear the runway expeditiously and rapidly.

From the foregoing it will now be seen that there is herein provided an improved foaming apparatus for aircraft runways, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:

1. Apparatus for applying foam to aircraft runways comprising, in combination, a tank vehicle having a body with a foam tank and a water tank therein, a pressure pump carred by said body, a motor for said pump, a connection between said foam tank and said pump, a second connection between said water tank and said pump, a common outlet from said pump, a main discharge pipe carried transversely across the rear of said vehicle, auxiliary discharge pipes pivotally connected to the ends of said main pipe, foam nozzles carried by said main and auxiliary discharge pipes, spreader plates suspended rearwardly from said auxiliary discharge pipes, a spreader plate suspended rearwardly of said main discharge pipe, and pivot means securing said spreader plates rearwardly of said auxiliary discharge pipes and said main discharge pipe, respectively, said spreader plates being movable about said pivot means between an out-of-the-way position and an operative position.

2. Apparatus for applying foam to aircraft runways comprising, in combination, a tank vehicle having a body with a foam tank and a water tank therein, a pressure pump carried by said body, a motor for said pump, a connection between said foam tank and said pump, a second connection between said water tank and said pump, a common outlet from said pump, a main discharge pipe carried transversely across the rear of said vehicle, auxiliary discharge pipes pivotally connected to the ends of said main pipe, foam nozzles carried by said main and auxiliary discharge pipes, spreader plates suspended rearwardly from said auxiliary discharge pipes, a spreader plate suspended rearwardly of said main discharge pipe, pivot means securing said spreader plates rearwardly of said auxiliary discharge pipes and said main discharge pipe, respectively, said spreader plates being movable about said pivot means between an out-of-the-way position and an operative position, and wheels carried by said spreader plates supporting the same when in said operative position.

3. Apparatus for applying foam to aircraft runways comprising, in combination, a tank vehicle having a body with a foam tank and a water tank therein, a pressure pump carried by said body, a motor for said pump, a connection between said foam tank and said pump, a second connection between said water tank and said pump, a common outlet from said pump, a main discharge pipe carried transversely across the rear of said vehicle, auxiliary discharge pipes pivotally connected to the ends of said main pipe, foam nozzles carried by said main and auxiliary discharge pipes, a check valve in said connection between said water tank and said pump, a closure valve in said connection between said foam tank and said pump, a foam regulating valve between said closure valve and said pump, a closure valve between said common outlet and said main discharge pipe, an auxiliary outlet from said pump adapted for the attachment of hand lines, a closure valve in said auxiliary outlet, spreader plates suspended rearwardly from said auxiliary discharge pipes and a spreader plate suspended rearwardly of said main discharge pipe, pivot means securing said spreader plates rearwardly of said auxiliary discharge pipes and said main discharge pipe, respectively, said spreader plates being movable about said pivot means between an out-of-the-way position and an operative position, and wheels carried by said spreader plates supporting the same when in said operative position.

4. An apparatus in accordance with claim 3 wherein said wheels support said spreader plates a predetermined distance above said runway when in said operative position.

5. Apparatus for applying foam to aircraft runways comprising, in combination, a tank vehicle having a body with a foam tank and a water tank therein, a pressure pump carried by said body, a motor for said pump, a connection between said foam tank and said pump, a second connection between said water tank and said pump, a common outlet from said pump, a main discharge pipe carried transversely across the rear of said vehicle, auxiliary discharge pipes pivotally connected to the ends of said main pipe, foam nozzles carried by said main and auxiliary discharge pipes, a check valve in said connection between said water tank and said pump, a closure valve in said connection between said foam tank and said pump, a foam regulating valve between said closure valve and said pump, a closure valve between said common outlet and said main discharge pipe, an auxiliary outlet from said pump adapted for the attachment of hand lines, a closure valve in said auxiliary outlet, spreader plates suspended rearwardly from said auxiliary discharge pipes and a spreader plate carried by said vehicle rearwardly of said main discharge pipe, means for folding said spreader plates to an out-of-the-way position when not in use, and wheels carried by said spreader plates supporting the same when in operative position, a bracket means secured to each of said auxiliary pipes, arcuate arms having substantially horizontally extending portions and substantially vertically extending portions, said substantially horizontally extending portions of said arcuate means being pivotally secured to said bracket means and said spreaders plates suspended rearwardly from auxiliary discharge pipes being secured to said substantially vertically extending portions of said arcuate arms.

6. Apparatus for applying foam to aircraft runways comprising, in combination, a tank vehicle having a body with a foam tank and a water tank therein, a pressure pump carried by said body, a motor for said pump, a connection between said foam tank and said pump, a second connection between said water tank and said pump, a common outlet from said pump, a main discharge pipe carried transversely across the rear of said vehicle, auxiliary discharge pipes pivotally connected to the ends of said main pipe, foam nozzles carried by said main and auxiliary discharge pipes, a check valve in said connection between said water tank and said pump, a closure valve in said connection between said foam tank and said pump, a foam regulating valve between said closure valve and said pump, a closure valve between said common outlet and said main discharge pipe, an auxiliary outlet from said pump adapted for the attachment of hand lines, a closure valve in said auxiliary outlet, spreader plates suspended rearwardly from said auxiliary discharge pipes and a spreader plate carried by said vehicle rearwardly of said main discharge pipe, means for folding said spreader plates to an out-of-the-way position when not in use, and wheels carried by said spreader plates supporting the same when in operative position, a bracket means secured to said main discharge pipe, an angled arm having an inclined portion and a substantially vertically extending portion, said inclined portion of said angled arm being pivotally secured to said bracket means and said spreader plate carried by said vehicle rearwardly of said main discharge pipe being secured to said substantially vertically extending portion of said angled arm.

7. An apparatus in accordance with claim 6 further including means to secure said spreader plate carried by said vehicle rearwardly of said main discharge pipe in said out-of-the-way position when not in use.

8. An apparatus in accordance with claim 7 wherein said last-mentioned means includes a platform extending rearwardly of said vehicle, means defining at least one opening in said platform, at least one lug secured to said angled arm and having a portion projecting through said opening in said platform when said angled arm is pivoted to said out-of-the-way position and means attachable to said portion of said lug to retain said lug and thereby said angled arm and spreader plate in said out-of-the-way position.

9. Apparatus for applying foam to aircraft runways comprising, in combination, a tank vehicle having a body with a foam tank and a water tank therein, a pressure pump carried by said body, a motor for said pump, a connection between said foam tank and said pump, a second connection between said water tank and said pump, a common outlet from said pump, a main discharge pipe carried transversely across the rear of said vehicle, auxiliary discharge pipes pivotally connected to the ends of said main pipe, and foam nozzles carried by said main and auxiliary discharge pipes, spreader plates suspended rearwardly from said auxiliary discharge pipes, and a spreader plate carried by said vehicle rearwardly of said main discharge pipe, said foam nozzles comprising an inlet pipe connected through said main discharge pipe and said auxiliary discharge pipes to the common outlet from said pump, a shield dependingly positioned upon said inlet pipe, said shield having an inlet end, an outlet end, means positioned between the inlet and outlet defining aspiration openings, means positioned within said shield for initially, medially and terminally diffusing said foam and a convex wire mesh screen positioned upon and covering the outlet end of said shield, said means for initially diffusing said foam comprises crossed wires positioned adjacent the inlet end of said shield, said means for medially diffusing said foam comprises a plurality of downwardly inclined spaced blade members positioned within said shield and peripherally spaced therefrom, and said means for terminally diffusing said foam comprises a spreader positioned adjacent the outlet end of said shield.

10. An apparatus in accordance with claim 9, wherein said spreader comprises a plate having a plurality of outwardly extending projections and an upwardly projecting central cone.

References Cited in the file of this patent

UNITED STATES PATENTS

| 1,120,426 | Vearing | Dec. 8, 1914 |
| 1,278,636 | Green | Sept. 10, 1918 |
| 2,098,523 | Simning | Nov. 9, 1937 |
| 2,394,017 | Seaman | Feb. 5, 1946 |
| 2,595,702 | Prevost | May 6, 1952 |
| 2,604,854 | Taylor | July 29, 1952 |
| 2,658,796 | Kopperschmidt | Nov. 10, 1953 |
| 2,740,664 | Yates | Apr. 3, 1956 |
| 2,759,762 | Kostka et al. | Aug. 21, 1956 |
| 2,772,921 | Nance | Dec. 4, 1956 |
| 2,829,874 | Freeman | Apr. 8, 1958 |
| 2,995,307 | McMahon | Aug. 8, 1961 |
| 2,998,930 | Aghnides | Sept. 5, 1961 |
| 3,001,720 | Cartwright | Sept. 26, 1961 |